US009002564B2

(12) United States Patent
Shaffer et al.

(10) Patent No.: US 9,002,564 B2
(45) Date of Patent: Apr. 7, 2015

(54) ENHANCED PARK ASSIST WHEEL SPEED COMPENSATION TECHNIQUE

(71) Applicant: Ford Global Technologies, LLC, Dearborn, MI (US)

(72) Inventors: Aric David Shaffer, Saline, MI (US); Michael David Kane, Brighton, MI (US); Vern Stempnik, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/868,247

(22) Filed: Apr. 23, 2013

(65) Prior Publication Data

US 2014/0316632 A1    Oct. 23, 2014

(51) Int. Cl.
| | | |
|---|---|---|
| G01C 22/00 | (2006.01) | |
| G05D 1/00 | (2006.01) | |
| G08G 1/16 | (2006.01) | |
| B62D 15/02 | (2006.01) | |
| G01S 15/93 | (2006.01) | |

(52) U.S. Cl.
CPC ............ G05D 1/0088 (2013.01); *B62D 15/028* (2013.01); *B60W 2550/308* (2013.01); G08G 1/168 (2013.01); *G01S 2015/933* (2013.01)

(58) Field of Classification Search
CPC .............. B62D 15/028; B60T 2201/12; B60T 2201/10; B60W 2550/308; B60W 2550/10; B60W 30/12; G01S 2015/933; G08G 1/168
USPC ............. 701/23, 527; 180/272; 340/903, 435, 340/436, 932.2
See application file for complete search history.

(56) References Cited

U.S. PATENT DOCUMENTS

| | | | |
|---|---|---|---|
| 6,061,002 A * | 5/2000 | Weber et al. ................ | 340/932.2 |
| 7,043,346 B2 | 5/2006 | Kubota et al. | |
| 8,055,429 B2 | 11/2011 | Kamiya et al. | |
| 8,248,471 B2 | 8/2012 | Inui et al. | |
| 8,290,657 B2 | 10/2012 | Lavoie | |
| 2007/0268157 A1* | 11/2007 | Hess et al. ................. | 340/932.2 |
| 2009/0071227 A1* | 3/2009 | Schmid et al. ................. | 73/1.79 |
| 2011/0260887 A1 | 10/2011 | Toledo et al. | |
| 2011/0288727 A1* | 11/2011 | Krautter et al. ................. | 701/41 |
| 2013/0024103 A1* | 1/2013 | Schneider ...................... | 701/301 |

FOREIGN PATENT DOCUMENTS

EP        1327553 A2     7/2003

* cited by examiner

*Primary Examiner* — Gertrude Arthur Jeanglaude
(74) *Attorney, Agent, or Firm* — Frank A. MacKenzie; Brooks Kushman P.C.

(57) ABSTRACT

A method of parking a vehicle includes calibrating a wheel speed count of the vehicle based on a measured length that is external to the vehicle, and parking the vehicle based on the calibrated wheel speed count.

14 Claims, 4 Drawing Sheets

ENHANCED PARK ASSIST WHEEL SPEED COMPENSATION TECHNIQUE

BACKGROUND

Park assist for automatically parking vehicles often relies on wheel speed counts to accurately derive a slot length and define and control the trajectory to accurately fit into the slot. However, due to uneven tire wear, aftermarket tires, tire pressure (due to elevated temperature), use of a mini spare, or full size replacement of a tire without wear, the system may be affected enough to noticeably prevent an accurate, automatic parallel park, when based on wheel speed counts.

SUMMARY

An active park assist system relies on ultrasonic sensor technology to scan and locate a suitable parking space to assist drivers in parking their vehicles next to a curb. Parking assist algorithms instruct a car to park based on assumed wheel information on the car, such as wheel diameters or radii. Thus an improved method of park assist includes obtaining wheel information is disclosed to improve park assist.

A method of parking a vehicle includes determining a distance traveled of the vehicle using a measured length that is external to the vehicle, correlating the distance traveled to a vehicle wheel parameter, and parking the vehicle based on the correlation.

A non-transitory computer-readable medium tangibly embodying computer-executable instructions comprising steps to determine a known distance that a vehicle has traveled based on measurements taken of distances that are external to the vehicle, correlate a wheel parameter of the vehicle to the known distance, and execute a vehicle parking algorithm based on the width calibrated wheel speed count.

A host vehicle includes a system for measuring a length traveled by the host vehicle using a reference distance that is external to the host vehicle, and a computer programmed to calibrate at least one wheel parameter of the host vehicle based on the measured length, and park the host vehicle based on the calibration.

DETAILED DESCRIPTION

Figure 1:
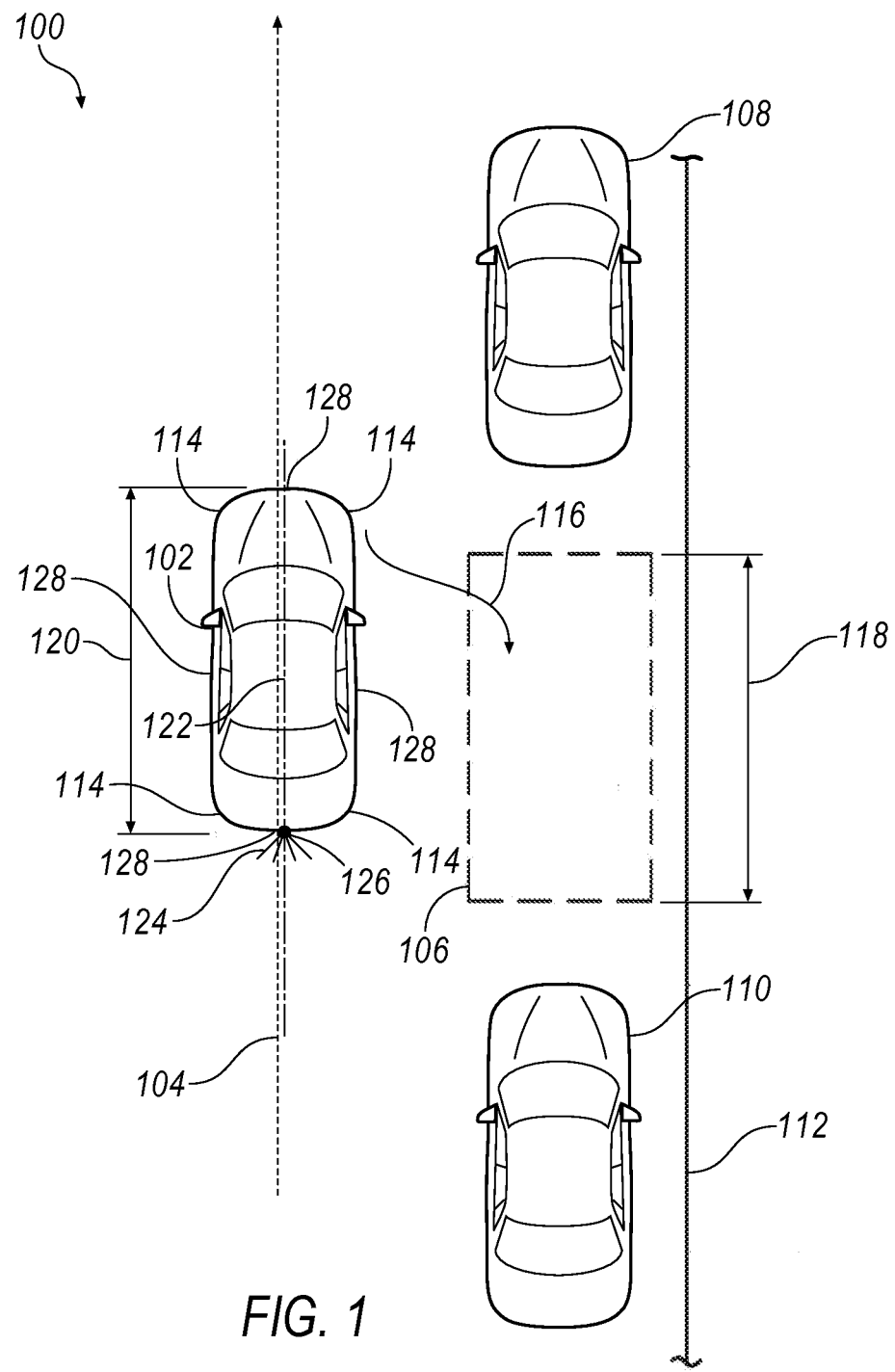
FIG. 1 illustrates a plan view of a host vehicle proximate front and rear cars that define a parking space for parking assist.

FIG. 1 shows a parking assist scenario 100 in which a running or host vehicle 102, such as a car, may employ a park assist system for assisting or instructing a driver in what actions to take to park the vehicle, such as when parallel parking. As host vehicle 102 passes along a path 104, a parking space 106 is identified by the park assist system as located between two parked vehicles 108 and 110. Parking space is thus defined between vehicles 108, 110, and is also defined by a constraint on the far side, such as a curb 112. Parking space 106 may be defined or bounded by any type or number or objects or constraints, not necessarily vehicles 108, 110 and curb 112.

Figure 2:
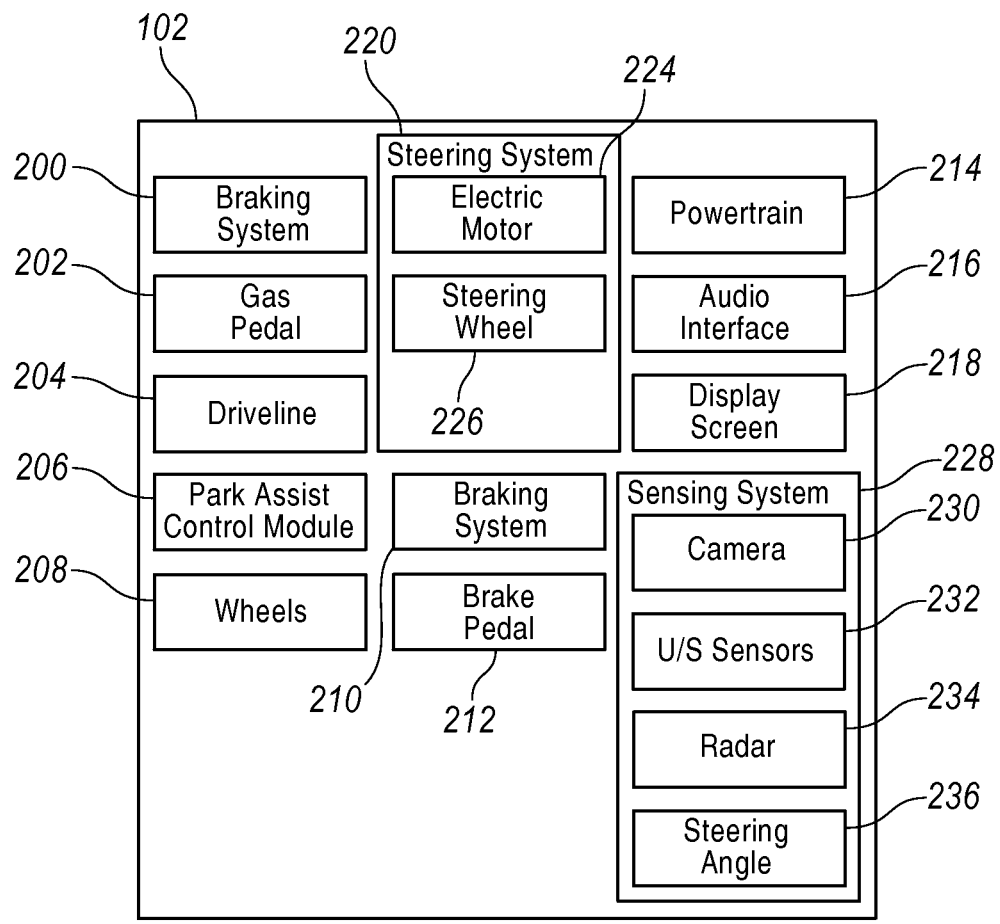
FIG. 2 illustrates elements of a host vehicle for parking assist.

Referring to FIG. 2, host vehicle 102 includes a braking system 200, a gas pedal 202, a driveline 204, a park assist control module (PACM) 206, and wheels 208. Vehicle 102 also includes a braking system 210, a brake pedal 212, a powertrain 214, an audio interface 216, and a display screen 218. A steering system 220 is shown in an example to include an electric motor 224 and a steering wheel 226. Steering system may be used in a power assisted steering system, or steering system 220 may include any type of steering system such as a conventional vacuum/hydraulic system, an electro-hydraulic power assisted system (EHPAS), or a 'steer-by-wire' system. Host vehicle 102 may include an accelerometer that measures an acceleration of vehicle 102.

In the illustrated embodiment, a sensing system 228 is operatively connected to vehicle 102 and may be coupled to PACM 206 to provide input signal(s) thereto. Sensing system 228 includes sensors for sensing the vehicle environment, such as a camera 230, ultrasonic (U/S) sensors 232 (which may include a transmitter and sensor), radar 234, and a steering sensor 236, as examples. Although not illustrated, sensing system 228 may also include systems that include but are not limited to LIDAR, thermal sensors, and GPS. As shown in FIG. 1, four sensors 114, such as ultrasonic sensors, may be located on the left and right sides of vehicle 102 adjacent front and rear bumpers to provide full or near-full 360° coverage around vehicle 102. The number, type, and/or the location of the sensors may be other than illustrated if so desired.

Sensing system 228 may include sensors for detecting the status or mode of operation of various systems on-board the vehicle 102, such as an odometer sensor (not shown) and/or steering wheel angle sensor 236. The odometer sensors may be located on one or more of wheels 226 of vehicle 102 and/or in the driveline system 204 of vehicle 102. Steering wheel angle sensor 236 is associated with steering system 220 of vehicle 102 and may, for example, be located on steering wheel 226 or on a steering column, as an example. Vehicle 102 may also be equipped with video display screen 218 for the display of various types of information to the driver. Vehicle 102 may also include audio interface device 216 such as a speaker, chime, buzzer, or other device for generating sound.

As shown in FIG. 1, vehicle 102 is parked into parking space 106 using PACM 206. To accomplish this, at least one of sensors 114 is used to detect neighboring objects and their location relative to the position of the vehicle 102 as vehicle 102 travels along path 104 and passes objects 110, 108. In FIG. 1, the neighboring objects that define parking space 106 are shown as being the two parked vehicles 110, 108 and curb 112. It is contemplated that PACM 206 may successfully identify a parking space 106 relative to only one object or vehicle, such as either the vehicle 108 or vehicle 110, if present.

PACM 206 includes a data processing component that processes the information from the sensor(s) to evaluate whether vehicle 102 may be successfully parked in parking space 106. The data processing component may, for example, be a computer device having software or firmware programmed therein, as is well known. Evaluation by PACM 206 may involve determining if a valid steering trajectory 116 can be performed to park vehicle 102 in parking space 106. If a valid steering trajectory 116 exists, PACM 206 deems parking space 106 to be a feasible parking space. The calculations performed by PACM 206 may include a determination of a proper slot length 118 depending upon considerations such as a length 120 of vehicle 102, and/or an achievable turning radius of vehicle 102, and/or any other geometric considerations related to vehicle 102 and/or other objects in the vicinity of parking space 106.

Movement of vehicle 102 along steering trajectory 116 may be performed in one or more parking maneuvers as may be necessary until it is properly parked. As used herein, one parking maneuver is defined as (1) moving the vehicle rearwardly from a stop into the parking space, (2) stopping the vehicle briefly within the parking space, (3) moving the vehicle forward within the parking space, and (4) then stopping and thus parking the vehicle. At least one actuation or movement of steering system 220 is usually required in association with each of the steps in the parking maneuver to achieve trajectory 116. A subsequent rearward and/or forward movement of vehicle 102, as may be necessary if parking space 106 is too short relative to vehicle length 120 and/or turning radius, defines an additional parking maneuver.

Once it is determined that vehicle 102 is properly parked in a desired parked condition, PACM 206 operates steering system 220 to return it to a centered condition. In one example, this involves actuating electric motor 224 to move steering wheel 226 and associated components of steering system 220 so that the steerable road wheels of vehicle 102 are aligned parallel with a longitudinal (front-to-rear) axis 122 of vehicle 102.

Figure 3:
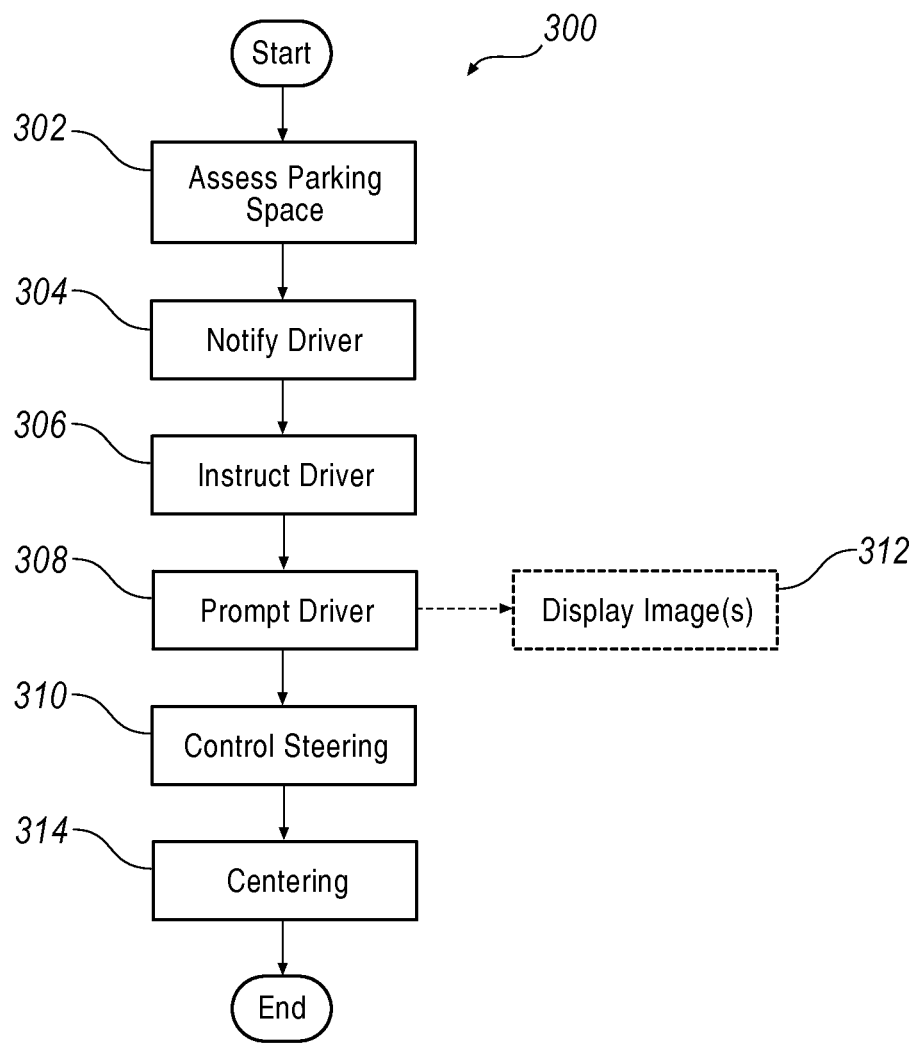
FIG. 3 illustrates a flowchart of a method for parking a vehicle.

Referring to FIG. 3, a flow chart 300 shows a method for parking a vehicle. At first step 302 a processing module, such as PACM 206, determines if there is a feasible parking space available for parking of vehicle 102. This may be accomplished, for example, using signals from sensor(s) 114 of sensing system 228. A feasible parking space is one, such as parking space 106, that is sufficiently large for vehicle 102 to fit into using the park assist system with which it is equipped.

If the parking space is determined at step 302 to be feasible for parking, the driver is notified or alerted at step 304 that a feasible parking space is available. The notification may be delivered via a visual and/or audible signal interface to, for instance, display screen 218 within vehicle 102. Alternatively, the visual interface may be a graphic image, icon, or other non-text representation on display screen 218. Such a visual interface may be located at any appropriate location in vehicle 102, such as an overhead console. Audible signals may be via audio interface 216, as another example.

Next, at step 306 the driver is instructed to stop the vehicle and to accept the system assistance to park. This instruction may be delivered visually and/or audibly, and may be accomplished by the same interface(s) used in step 304. Once the driver has stopped vehicle 102, at step 308 the driver is prompted to remove hands from the steering control device of the steering system (steering wheel 226, for example) and to actuate a brake control device (such as brake pedal 212) and a transmission control device (such as a gear select lever or button) to engage or shift the transmission of powertrain system 214 into reverse gear.

At step 310 the park assist system takes over control of steering system 224 to execute steering trajectory 116. In one example, the park assist system generates signals to prompt the driver to take actions necessary to drive the vehicle backwards and pull forward (in one or more parking maneuvers) to achieve a parked condition of vehicle 102 in parking space 106. The parked condition may be defined, depending upon the nature and dimensions of the parking space, as when vehicle 102 is within a certain distance of one or more of the objects or features that define the space and/or within a certain angular measure of being parallel with the appropriate objects/features.

Driver actions prompted at step 308 may include actions such as actuating brake pedal 212 of braking system 210 to control the speed of the vehicle and/or actuating a transmission control device to engage or shift the transmission of powertrain system 214 between forward and reverse gears.

As indicated at step 312, the method may optionally include displaying to the driver an image of the parking space environment. For example, an image 124 from a rear view camera 126 may be displayed on a video display screen. In another example, a simulated or virtual top view showing the vehicle and its location relative to the parking space may be displayed on display screen 218. Either of these images may be overlaid with lines and/or other symbols depicting the desired steering trajectory 116. In one embodiment, radar systems 128 may be included in the front, and/or rear, and/or sides of vehicle 102.

When the park assist system has determined that vehicle 102 is properly parked and the final movement of the parking maneuver is complete, the method progresses to step 314 where steering system 220 is operated to place it in a centered condition between surrounding objects such as vehicles 108, 110, or generally in line with curb 112 and/or path 104. This may involve actuating electric motor 224 that provides power boost to the steering system so as to move steering wheel 226 along with associated components of steering system 220 until vehicle 102 wheels are parallel with axis 122 of vehicle 102.

Although the parking space 106 has been described as a parallel parking space between a forward first object and a rearward second object, the parking space may alternatively be a rear perpendicular parking space, such as found in typical multi-vehicle parking lots and garages. Additionally, parking space 106 has been described as being on the right side of the vehicle 102, but alternatively the park assist system may be used to identify a parking space on the left side of vehicle 102.

Figure 4:
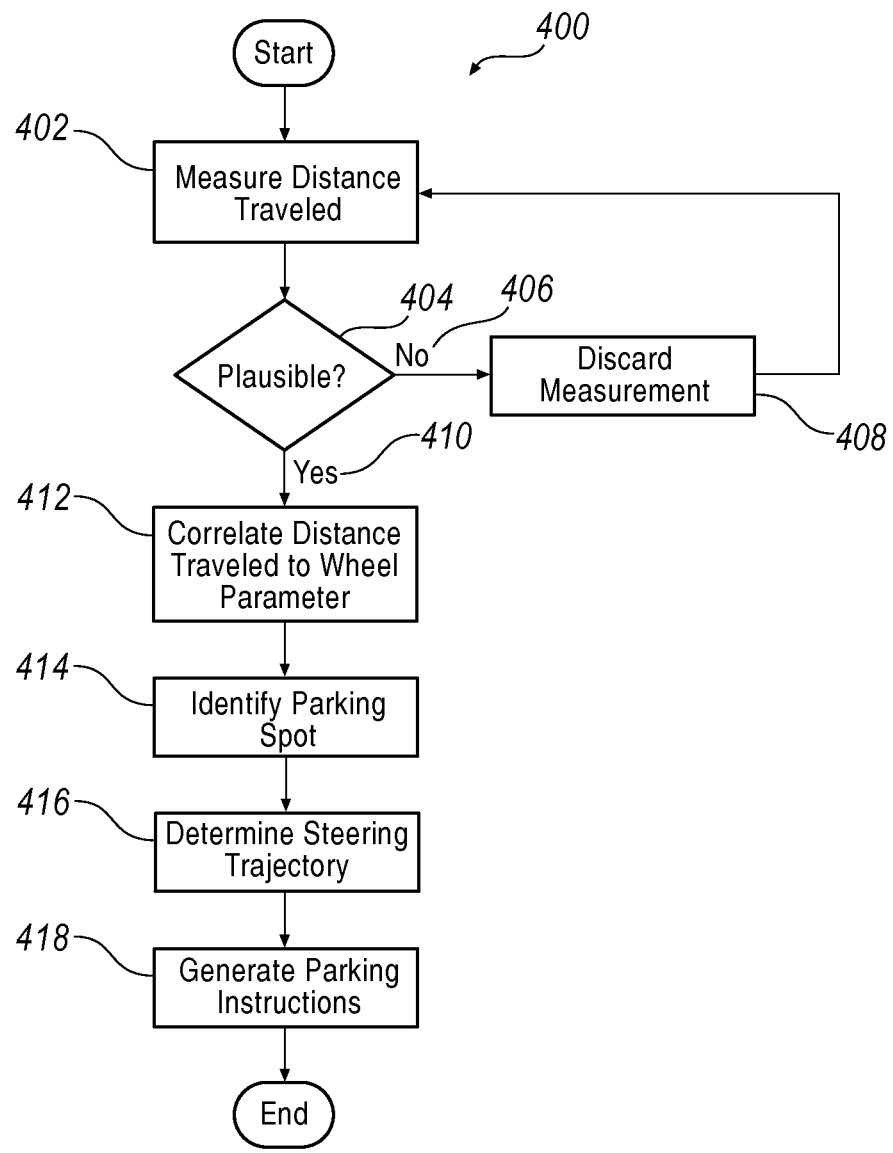
FIG. 4 illustrates steps of a method for park assist.

Referring to FIG. 4, algorithm or method 400 illustrates logic of an embodiment of the disclosed method for park assist. Method 400 begins with measuring a distance traveled at step 402. The distance traveled is determined using a measured length that is external to a vehicle that will be parked using park assist, such as vehicle 102 of FIG. 1. The measured length external to the vehicle may include but is not limited to global positioning system (GPS) (which may be synchronized with a cell phone or a smart phone), one or more ultrasonic (U/S) sensors, radar, a camera, and an accelerometer, as examples. The accuracy of the external length measurement may vary, depending on the accuracy of the measurement and depending on other factors such as wheel diameter, speed count, and the like. For instance, a GPS system may have the capability to measure over a short distance of 0.1 miles (0.16 km) or less, to a more lengthy distance of a few miles (kilometers) or greater to reduce measurement error. In other examples, an ultrasonic system or a camera may measure much shorter distances, but may be able to do so very accurately in comparison to, for instance, a GPS. Similarly, a radar system may be used to measure a distance traveled based on objects detectable by the radar. In fact, step 402 includes any measurement method or technique in which a distance is measured using a measured length that is external to the vehicle.

Method 400 includes a step 404, according to one embodiment, for checking the plausibility of the distance measured at step 402. The plausibility check is performed to assist in determining whether the distance traveled is likely to be accurate. According to embodiments, the plausibility check is conducted using systems that may include a global positioning system (GPS), an ultrasonic sensor on the vehicle, an accelerometer, an adaptive cruise control (ACC) system, activation of antilock brakes or traction control. In one embodiment, the accelerometer measures acceleration in 3-space (x, y, and z coordinates).

Typically, it is undesirable to perform a distance measurement calibration when the vehicle is going through a calibration disruptive event. A calibration disruptive event is defined as an event during which a calibration or measured length may not be deemed to be reliable. For instance, a calibration disruptive event may be caused by excessive acceleration or deceleration, while climbing or descending a steep hill, while traversing a winding road, or if the vehicle goes into a skid, as examples, which may be detected using the above systems. More broadly, a calibration disruptive event may be any event that may cause a calibration measurement to become suspect or unreliable. In contrast and in general, it is desirable to perform length measurements for the purpose of wheel parameter calibration during periods of driving that may be in flat, generally horizontal (e.g., not hilly) terrain. Thus, if a disruptive event happens during the calibration, the measurement is not plausible 406, the calibration is discarded 408, and control returns to step 402 to seek the next opportunity to perform the calibration.

As one example, during a period when the vehicle is moving at a generally constant speed, such a period is detected by PACM 206 and PACM 206 may thereby initiate measuring the distance traveled for the purpose of conducting a calibration of the wheel parameter. Such may occur while in cruise control or during generally constant speed operation. However, if a disruptive event occurs, PACM 206 detects the event and deems the calibration to not be plausible. However, if such a disruptive event does not occur, then the calibration data obtained is deemed to be plausible and PACM 206 proceeds to correlate the distance traveled with the wheel parameter at step 412.

Correlation may be performed using the distance measurements as described, which also can be applied to calibrate the wheel parameter of one or all of the wheels of the vehicle, and compensate for any disparities. The wheel parameter may be a wheel radius, a wheel diameter, a wheel circumference, and a wheel speed count, as examples. That is, when a known distance is measured 402 and the data is deemed to be plausible 410, measurements of one or more wheels of the vehicle may be made to correlate the wheel parameter. For instance, by also measuring the number and/or speed of wheel turns during the calibration period, the length measured through other means (i.e., the GPS) can then be applied to determine the wheel parameters through a simple algebraic calibration (wheel circumference=wheel diameter×$\pi$). The length measured can then be translated via the number of wheel rotations to yield the wheel parameter.

Calibration measurements at step 402 may be performed routinely with or without driver knowledge. That is, because PACM 206 has the capability to interact with distance measuring devices (GPS, U/S, etc . . . ) and because PACM 206 can detect when calibration disruptive events occur, the measurement at step 402 and determination of plausibility at step 404 may be performed in the background and without communication with the driver. However, in one embodiment the driver may be prompted to perform a calibration and the driver may also be prompted to identify if a disruptive event occurs, when the driver may then deem the data to not be plausible and the calibration is canceled. Wheel parameter correlations may in fact be constantly going on in the background and whenever conditions for calibration are detected, the calibration may occur so long as the data obtained is deemed plausible.

Once the wheel parameter correlation is complete, the wheel parameter may be compared to specifications of the vehicle. For instance, the obtained wheel parameter may indicate that the wheel is out of specification or that an incorrect wheel is on the vehicle. That is, the pressure may be low, a non-OEM tire (or aftermarket tire) may be on the vehicle, a mini-spare may be at one or more of the vehicle wheel locations, or one or more of the tires may be worn, as examples. In such an event, the driver may be alerted and notified as to what has been detected. Further, if the correlation is suspect, according to one embodiment a default wheel parameter is used in lieu of using a correlation that is based on a suspect distance travelled measurement.

During park assist, a parking spot is identified at step 414, and a steering trajectory (such as steering trajectory 116 as described above) is determined at step 416. Steering trajectory 116 is thereby obtained and based on the correlation to the wheel parameter, and parking instructions are generated at step 418 for the driver to execute.

PACM 206 may include a computer or a computer readable storage medium implementing method or algorithm 400. In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method of parking a vehicle, comprising:
   acquiring a measured length representing a distance travelled by the vehicle;
   in response to an indication that a calibrative disruptive condition, including acceleration or deceleration exceeding a predetermined threshold, occurred while the measured length was acquired, discarding the measured length;
   in response to an absence of the indication, correlating the distance traveled to a vehicle wheel parameter; and
   parking the vehicle based on the correlation.

2. The method of claim 1, wherein the vehicle wheel parameter is a wheel radius, a wheel diameter, a wheel circumference, or a wheel speed count.

3. The method of claim 2, further comprising detecting, based on the vehicle wheel parameter, whether at least one of the wheels of the vehicle is a mini spare, has low pressure, is a worn tire, or is an aftermarket tire.

4. The method of claim 3, further comprising generating an alert in response to the detecting.

5. The method of claim 3, further comprising discarding the correlation in response to the detecting.

6. A non-transitory computer-readable medium tangibly embodying computer-executable instructions that, when executed by a processor, cause the processor to
   acquire a measured length representing a distance travelled by a vehicle;
   in response to an indication that a calibrative disruptive condition, including road grade exceeding a predetermined threshold, occurred while the measured length was acquired, discard the measured length;
   in response to an absence of the indication, correlate the distance traveled to a vehicle wheel parameter; and
   execute a vehicle parking algorithm based on the correlation.

7. The non-transitory computer-readable medium of claim 6, wherein the vehicle wheel parameter is a wheel radius, a wheel diameter, a wheel circumference, or a wheel speed count, and wherein the computer-executable instructions further cause the processor to detect, based on the vehicle wheel parameter, whether at least one of the wheels of the vehicle is a mini spare, has low pressure, is a worn tire, or is an aftermarket tire.

8. The non-transitory computer-readable medium of claim 7, wherein the computer executable instructions further cause the processor to generate an alert in response to the detecting.

9. The non-transitory computer-readable medium of claim 7, wherein the computer executable instructions further cause the processor to discard the correlation in response to the detecting.

10. A vehicle, comprising:
    a controller programmed to
    acquire a measured length representing a distance travelled by the vehicle,
    in response to an indication that a calibrative disruptive condition, including a vehicle skid, occurred while the measured length was acquired, discarding the measured length,
    in response to an absence of the indication, correlating the distance traveled to a vehicle wheel parameter, and
    park the vehicle based on the correlation.

11. The vehicle of claim 10, wherein the vehicle wheel parameter is a wheel radius, a wheel diameter, a wheel circumference, or a wheel speed count.

12. The vehicle of claim 11, wherein the controller is further programmed to detect, based on the vehicle wheel parameter, whether at least one of the wheels of the vehicle is a mini spare, has low pressure, is a worn tire, or is an aftermarket tire.

13. The vehicle of claim 12, wherein the controller is further programmed to generate an alert in response to the detecting.

14. The vehicle of claim 12, wherein the controller is further programmed to discard the correlation in response to the detecting.

\* \* \* \* \*